April 14, 1931.  J. DONALDSON  1,800,782
TRACTOR
Filed Jan. 20, 1925   2 Sheets-Sheet 2

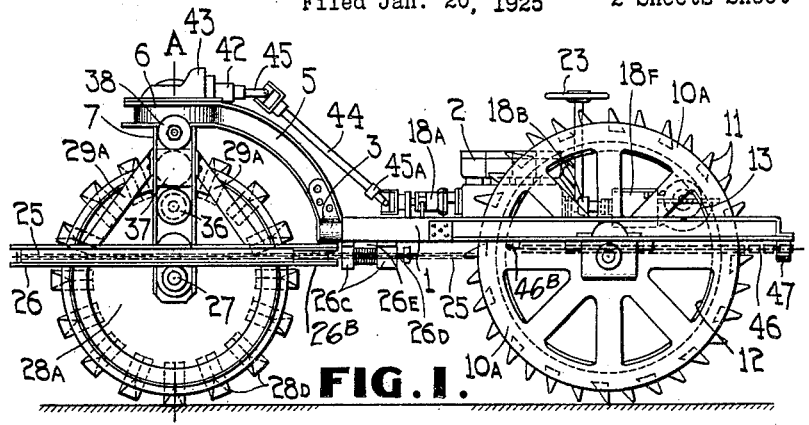

Inventor
J. Donaldson
By  *signature*  Atty.

Patented Apr. 14, 1931

1,800,782

UNITED STATES PATENT OFFICE

JOHN DONALDSON, OF DUNEDIN, OTAGO, NEW ZEALAND

TRACTOR

Application filed January 20, 1925. Serial No. 3,677.

This invention relates to an oil driven tractor for agricultural purposes.

The object of the invention is to eliminate soil friction while travelling over cultivated soil.

I accomplish the object by an arrangement of skeleton wheel construction, having gripper members, which form the tread of the said skeleton wheels and the said gripper members adapted to grip firmly the cultivated soil at the bottom of the furrow, all of the wheels in the tractor being driven.

A further object of the invention is to use the gripper members, forming the tread of the skeleton wheel, while travelling over matted pasture land to cut into the surface thereof during ploughing operations.

The use of the tractor may be further extended to eliminate discing; this is accomplished by crossing and re-crossing the land at different angles before ploughing.

There is an arrangement whereby the tread of the skeleton wheels may be used, for the purpose of crushing clods; a suitable arrangement is as follows.

A number of 6"x1" hard wooden battens grooved along their centers and at each end; the said battens are placed in position on the face of the wheel and parallel to the wheel axle.

In the drawing accompanying the specification,

Figure 1 is a side view of the tractor.

Figure 2 is a plan view of the tractor.

Figure 3 is a cross sectional elevation through line A—B, Fig. 1.

Figure 5 is a plan view showing the reversing mechanism.

Figure 4:
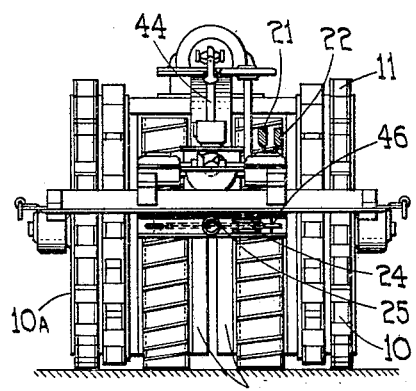
Figure 4 is an end view of the tractor looking from the rear end.
Figure 8:
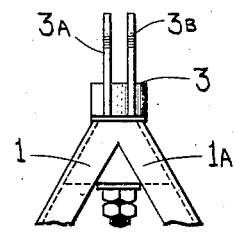
Figure 8 is a detail of the trunnion bearing.
Figure 9:
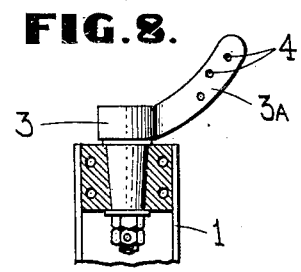
Figure 9 is a side view, the bearing being in section.
Figure 11:
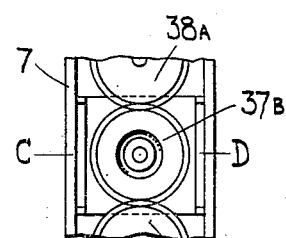
Figure 11 is a side elevation with the cover removed.
Figure 12:
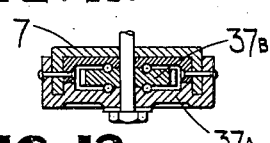
Figure 12 is a section through C—D, Figure 11.
Figure 10:
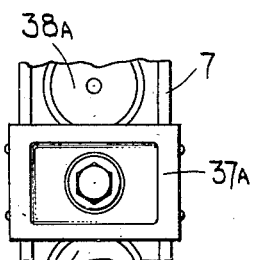
Figure 10 is a side elevation showing the casing of the idler pinion in the front wheel drive.

The following is a description of the invention.

There is a main frame member comprised of two channel steel joists 1 and 1A, while having the one end of each member a sufficient distance apart to allow for the engine 2, and necessary fittings, the other end of each said channel converges to a swivel joint member or trunnion 3. From the said converging end of the main frame 1 and 1A secured thereto by means of straps 3A and 3B and bolts inserted through openings 4, are two curved channel steel members 5 and 5A, which terminate at the top, having a collar like structure 6, which supports the front carriage 7 and provides for a rotative support for such carriage, as indicated at 7A. There is an angle iron frame 8 secured to the main frame, the said frame 8 provides support for the external portion of the skeleton wheel shafts 9.

There are skeleton wheels 10 and 10A mounted and supported by the frame 8, and the rear ends of the channel steel 1 and 1A. The wheels 10 and 10A consist of three circular plates 10B, 10C and 10D, two external, 10B, and 10D, and one, 10C in the centre supporting the gripper plate members 11, which are so constructed that they will have a maximum of gripping power, (this relates particularly to soft subsoil) and at the same time, clear themselves when emerging from the ground. The inside surface of each rear skeleton wheel has fastened to it an internal spur gear wheel 12.

In mesh with this wheel there are pinions, one of which is indicated at 13, supported by the channel steel frames 1 and 1A and mounted on the back axles 15 and 15A. Between the pinion 13 and the differential gear 17, there are reversing gear housings 16 and 16A. The reversing gear mounted in the housing 16 comprises a part of the back axles 15, having splines 15B thereon and a reduced diameter projecting into a shaft 15C, which has mounted thereon a pinion 15D having dog clutches 15E formed preferably integral therewith, the said dogs engaging a counter part clutch 15F made slidable on the splines 15B on the axle 15. The said pinion 15D is in constant mesh with a pinion 15G on the lay shaft 15N slidably mounted on a stub axle 15H, and upon or in a bearing 15J there is a sleeve part 15K projecting from the slidable pinion 15G, which has a groove 15L therein associated with mechanism, indicated at 15M.

There is a second pinion 15P mounted on the lay shaft 15N, which, when shifted to reverse the gear, meshes with an internal spur gear wheel 15Q and at the same time disengaging the parts 15E and 15F. The said gear wheel 15Q is keyed to the back axle 15. At right angles to axles 15 and 15A, there is the engine Cardan shaft 18, having mounted on its rear end a bevel pinion 19, which is in mesh with a crown wheel 20, thereby transmitting the impulse of the motor to the rear driving wheels 10 and 10A by means of the differential 17, the engine 2 is mounted on channel steel frames 1 and 1A, preferably in front of the rear axles 15 and 15A, and is of the heavy duty type. The clutches on the Cardan shaft 18 are indicated at 18A and 18B; they are similar in construction, and consist of the well known plate clutch type.

In the rear of the plate clutch 18B there is a differential motion consisting of clutch members 18C and 18D, held normally in contact by the spring 18E; the whole contained is a housing 18F. The purpose of the said differential motion is to compensate irregularity in speeds between front and rear wheels. Members 21 and 22 indicate clutch and foot brake pedal levers, which are confined to the engine 2. To the right hand side of the engine there is the steering column 23, which by means of a sheave 24, a chain 25 and chain race 26 provides the means by which the front carriage is turned to steer the tractor.

There is a buffer member 26B, which is a segment, the arc of which coincides with the periphery of the chain race 26, the said buffer is secured to the undersurface of the main frames 1 and 1A by brackets 26C adapted to support the said segment by means of a spindle 26D, which is attached to the said segment 26B. A spring 26E holds the said segment in normal engagement with the chain race 26 with force to prevent undue strain upon the fore-carriage, due to the forward motion of the tractor. The front carriage frame 7 consists mainly of a channel steel inverted U shaped member or yoke, which supports the front axle 27, on which is mounted the two wheels 28 and 28A. Above the shaft centre and encircling the two wheel members 28 and 28A is an angle iron frame 29 and the chain race 26 constructed of channel steel.

The said angle iron frame 29 is secured to the chain race 26 to stiffen the said race, which is also secured to the vertical members 7 of the inverted U shaped front carriage, as indicated at 26A, and by the diagonal stays 29A, so that the front carriage may turn on its pivot 7B, when operated by the steering mechanism.

The front wheels 28 and 28A are skeleton wheels which consist of circular plates 28B and 28C, which are fixed to hubs 28E and 28F mountable upon the front axle 27 mounted on bearings. Fixed to the frame 7 on the inner circular plates 28B and 28C, there are treads 28H secured to extend the width of the wheel and to prevent it from sinking too far into the ground.

Upon each wheel 28 and 28A are mounted internal spur gearing wheels 32 and 32A similar to those on rear wheels 10 and 10A. The construction of which consists preferably of an angle iron ring 32B machined to receive the rim of the internal spur gears 32 and 32A made with a shrinking fit.

In mesh with the gears 32 and 32A are pinions 33 and 33A, the spindles 34 and 34A of which pass through frame 7, and supporting bearings 35 and 35A of the front carriage. Secured to the said spindles 34 and 34A are two other gears 36 and 36A and the said bearings 35 and 35A also support the idler casings 37 and 37A; the idlers 37B and 37C therein mesh with the pinions 36 and 36A, and two other free wheel pinions 38 and 38A. The free motion of the said pinions 38 and 38A is provided by clutch members 38B and 38C, which transmit a differential motion to the wheels 28 and 28A of the front carriage, for the purpose of compensating the irregularity of speed between the two front wheels, when turning the tractor.

A cross shaft 39 having mounted thereon the said free wheel pinions 38 and 38A, and also a bevel pinion 39A is supported by bearings 40 and 40A secured to the front carriage frame 7. Bevel pinion 39A engages with a bevelled crown wheel 41 having teeth on both faces; the crown wheels are housed above the trunnion 7 of the front carriage.

Figure 6:
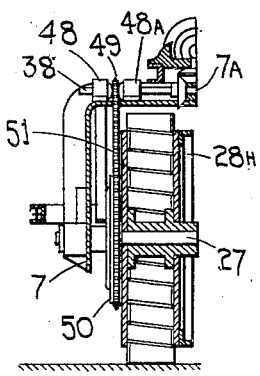
Figure 6 is a half section of the front carriage showing a chain drive.
Figure 7:
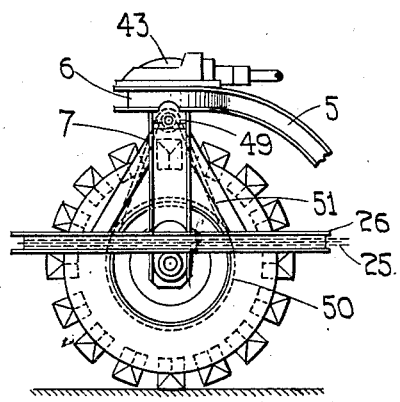
Figure 7 is a side elevation of Figure 6.

Another shaft 42 is so mounted in a metal casing and bearing 43, that bevel pinion 41A will engage with top side of crown wheel 41. In the alternative drive the pinions 36A, 37B and 38A and the internal spur gears 32 and 32A are omitted, the cross shaft 39 is shortened and supported by bearings, one pair thereof being indicated at 48 and 48A in Figure 6, sprocket pinion 49 is substituted for the said pinions, and a sprocket 50 is substituted for the said internal spur gears; the sprocket and wheel being coupled by the chain 51. Direct working contact is established between the engine to the fore-driving gear by means of a propeller shaft 44, and universal joints 45 and 45A.

There are drag chains 46 projecting rearwards from the main channel frames 1 and 1A being fixed thereto, as indicated at 46A and 46B and supported by a bar 47, which is attached to the angle iron frame 8.

What I claim as new and desire to secure by Letters Patent is:—

A tractor including a rear horizontal rectangular frame, longitudinal frame bars extending longitudinally of and within the rectangular frame, said frame bars extending in advance of the rear frame and converging to a bearing in the longitudinal median line of the rear frame, a forward frame of U-form arranged at a right angle to the rear frame, a frame bar rotatively connected to the forward frame and curving rearwardly and downwardly to said bearing, a circular chain race secured to the forward frame for controlling the rotative movement of the forward frame, said chain race being arranged in a plane parallel to and below the rear frame, a drive means operatively connected to the front wheel, a motor on the rear frame, and drive shafting including a section at the upper end of the frame bar, a section extending from the motor and an intermediate section universally jointed at its ends to said sections and spanning the frame bearing.

In testimony whereof I affix my signature.

JOHN DONALDSON.